United States Patent
Nie et al.

(10) Patent No.: US 9,973,646 B2
(45) Date of Patent: May 15, 2018

(54) SCANNING DEVICE AND SCANNING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xiao-Jun Nie, Shenzhen (CN); Wen-Ping Wang, Shenzhen (CN); Jin Wen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/412,136

(22) Filed: Jan. 23, 2017

(65) Prior Publication Data

US 2017/0214817 A1 Jul. 27, 2017

(30) Foreign Application Priority Data

Jan. 27, 2016 (CN) .......................... 2016 1 0061852

(51) Int. Cl.
*H04N 1/04* (2006.01)
*H04N 1/10* (2006.01)
*H04N 1/40* (2006.01)

(52) U.S. Cl.
CPC ......... *H04N 1/1021* (2013.01); *H04N 1/1035* (2013.01); *H04N 1/40056* (2013.01); *H04N 2201/0081* (2013.01)

(58) Field of Classification Search
CPC ............... H04N 1/1021; H04N 1/1035; H04N 1/40056; H04N 2201/0081
USPC .......................................... 358/474, 498, 497
See application file for complete search history.

(56) References Cited

U.S. PATENT DOCUMENTS

| 2011/0061505 A1* | 3/2011 | Begin .................. B23D 45/003 83/72 |
| 2013/0055911 A1* | 3/2013 | Mizuno .................. B41F 15/08 101/129 |
| 2016/0092849 A1* | 3/2016 | Cirannek ............. G06K 9/6201 705/26.4 |

* cited by examiner

*Primary Examiner* — Houshang Safaipour
(74) *Attorney, Agent, or Firm* — ScienBiziP, P.C.

(57) ABSTRACT

A scanning device configured to scan an electronic device includes a first driving device and a scanner mounted on the first driving device to scan the electronic device. A platform supports the electronic device, and the first driving device drives the scanner to move toward the electronic device placed on the platform and to scan the electronic device. The scanning device can control the first driving device to drive the scanner mounted on the first driving device to move a first preset distance along a first direction from an initial position, and control the scanner to scan the electronic device supported on the platform.

12 Claims, 7 Drawing Sheets

SCANNING DEVICE AND SCANNING METHOD

CROSS-REFERENCE TO RELATED APPLICATIONS

This application claims priority to Chinese Patent Application No. 201610061852.0 filed on Jan. 27, 2016, the contents of which are incorporated by reference herein.

FIELD

The subject matter herein generally relates to the quality checking and testing field, and particularly, to an optical scanning device and scanning method for scanning bar codes of electronic products.

BACKGROUND

In the production process of electronic products, a scanning device may be employed to scan the electronic products, for example, the scanning device is used to automatically scan bar codes on the electronic products.

BRIEF DESCRIPTION OF THE DRAWINGS

Implementations of the present disclosure will now be described, by way of example only, with reference to the attached figures.

DETAILED DESCRIPTION

Figure 1:
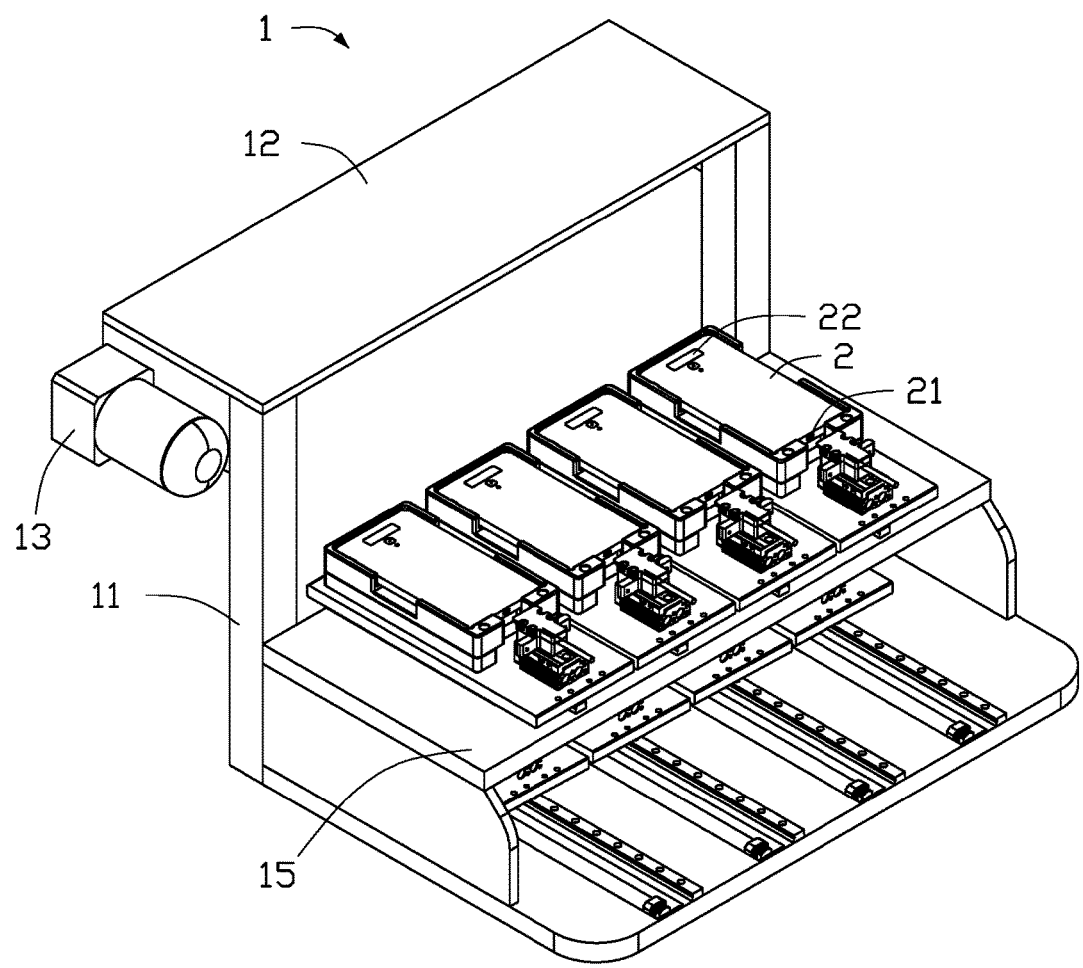
FIG. 1 is an isometric view showing an exemplary embodiment of a scanning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series and the like.

Exemplary embodiments of the present disclosure will be described in relation to the accompanying drawings.

Figure 2:
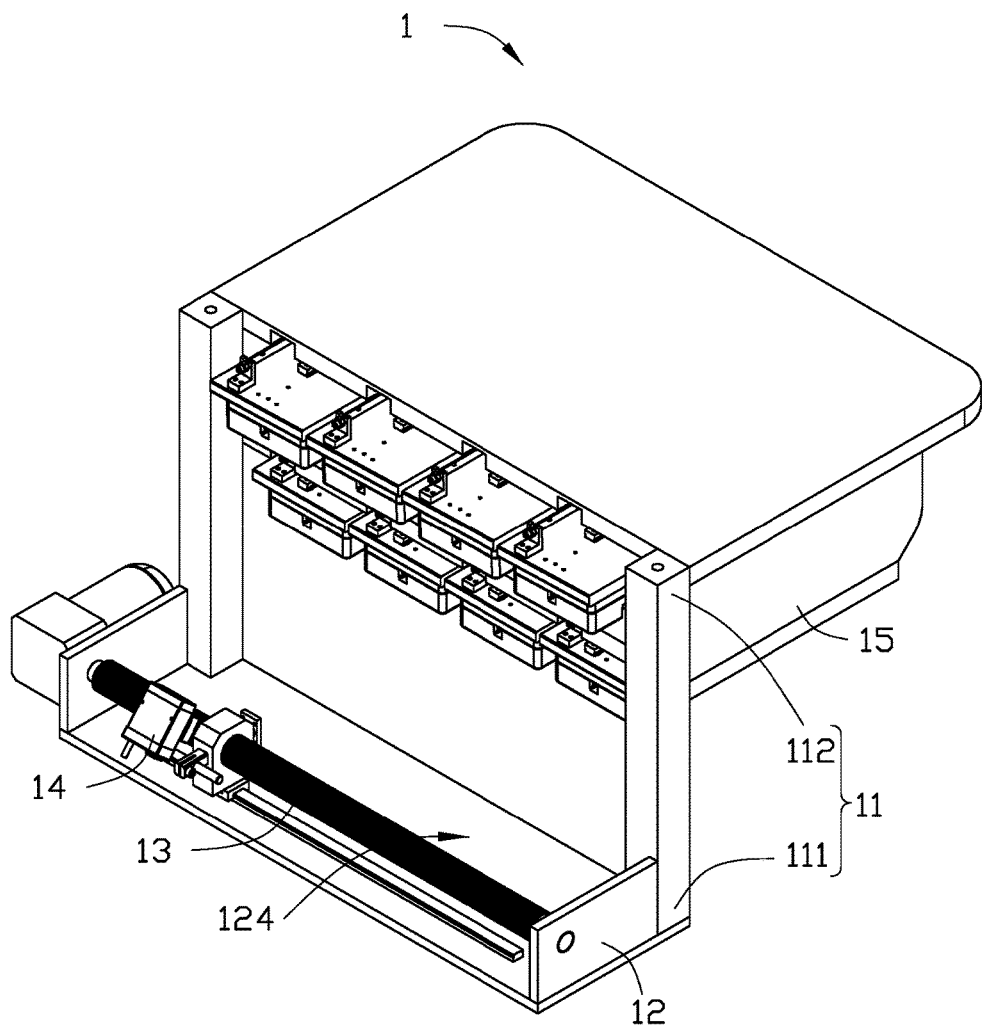
FIG. 2 is an isometric view showing the scanning device of FIG. 1 from another view.

FIGS. 1-2 illustrate an exemplary embodiment of a scanning device 1. The scanning device 1 is used to scan a code or symbol of at least one electronic device 2. In at least one exemplary embodiment, the scanning device 1 can include a support frame 11, an assembly table 12, a first driving device 13, a scanner 14, and a platform 15. The assembly table 12 is set on a top end 111 of the support frame 11. The platform 15 is set on a bottom end 112 of the support frame 11. The first driving device 13 is set on the assembly table 12. The scanner 14 is set on the first driving device 13 and is able to move on the first driving device 13. The platform 15 is used to support the at least one electronic device 2 to be scanned. Under the driving of the first driving device 13, the scanner 14 can move toward the electronic device 2 placed on the platform 15 and scan the electronic device 2. In at least one exemplary embodiment, the electronic device 2 includes a data interface 21 and a label 22.

Figure 3:
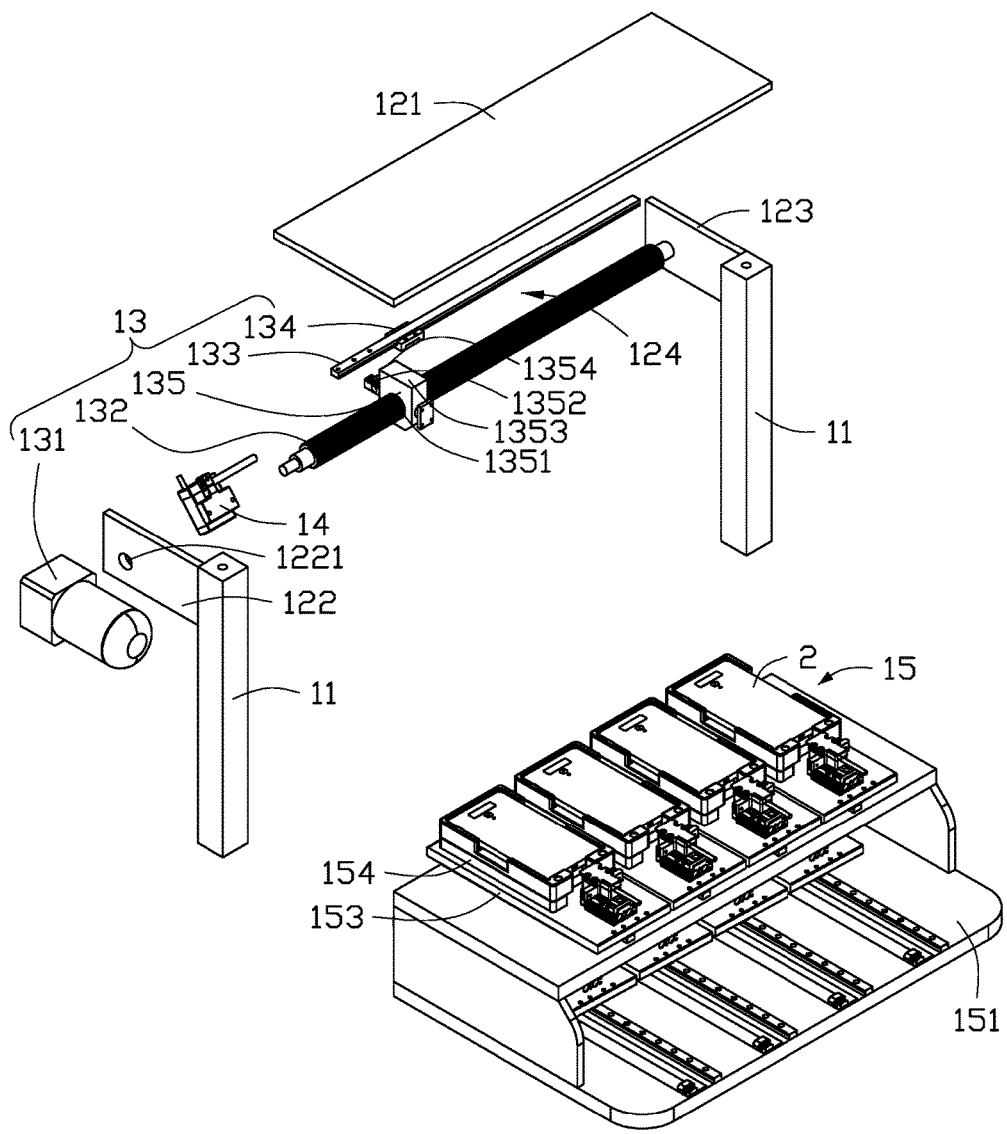
FIG. 3 is a partial exploded, isometric view of the scanning device of FIG. 1.

FIG. 3 illustrates the scanning device of FIG. 1. The assembly table 12 includes a horizontal plate 121, a first side panel 122, and a second side panel 123. Each of the first side panel 122 and the second side panel 123 is connected to an end of the horizontal plate 121. The support frame 11 is connected to the horizontal plate 121 to support the assembly table 12. A receiving space 124 (as shown in FIG. 2) is defined among the horizontal plate 121, the first side panel 122, and the second side panel 123. A part of the first driving device 13 is received in the receiving space 124 as shown in FIG. 2.

The first driving device 13 includes a first driver 131, a lead screw 132, a first sliding rail 133, a first sliding block 134, and an assembly block 135. The lead screw 132 is pivotally mounted between the first side panel 122 and the second side panel 123. A first hole 1221 is defined in/by the first side panel 122. One end of the lead screw 132 passes through the first side panel 122 by the first hole 1221 of the first side panel 122. The first driver 131 is mounted on the first side panel 122 and is connected to the lead screw 132 to rotate the lead screw 132. The first sliding rail 133 is mounted on the horizontal plate 121 and is parallel to the lead screw 132. The first sliding block 134 is slidably mounted on the first sliding rail 133. The assembly block 135 defines a second hole 1351. The assembly block 135 is movably covered the lead screw 132 by the second hole 1351 of the assembly block 135. The assembly block 135 is connected to the first sliding block 134. The scanner 14 is mounted on the assembly block 135.

In the exemplary embodiment, when the first driver 131 rotates the lead screw 132, the assembly block 135 moves along the lead screw 132, thus moving the scanner 14 and the first sliding block 134 along the first sliding rail 133. In the exemplary embodiment, the first driver 131 can be a servo motor or a stepper motor. The scanner 14 can be a QR Droid Private. The scanner 14 is able to move toward the electronic device 2 to scan the code or symbol of the electronic device 2 under the driving of the first driver 131.

Figure 4:
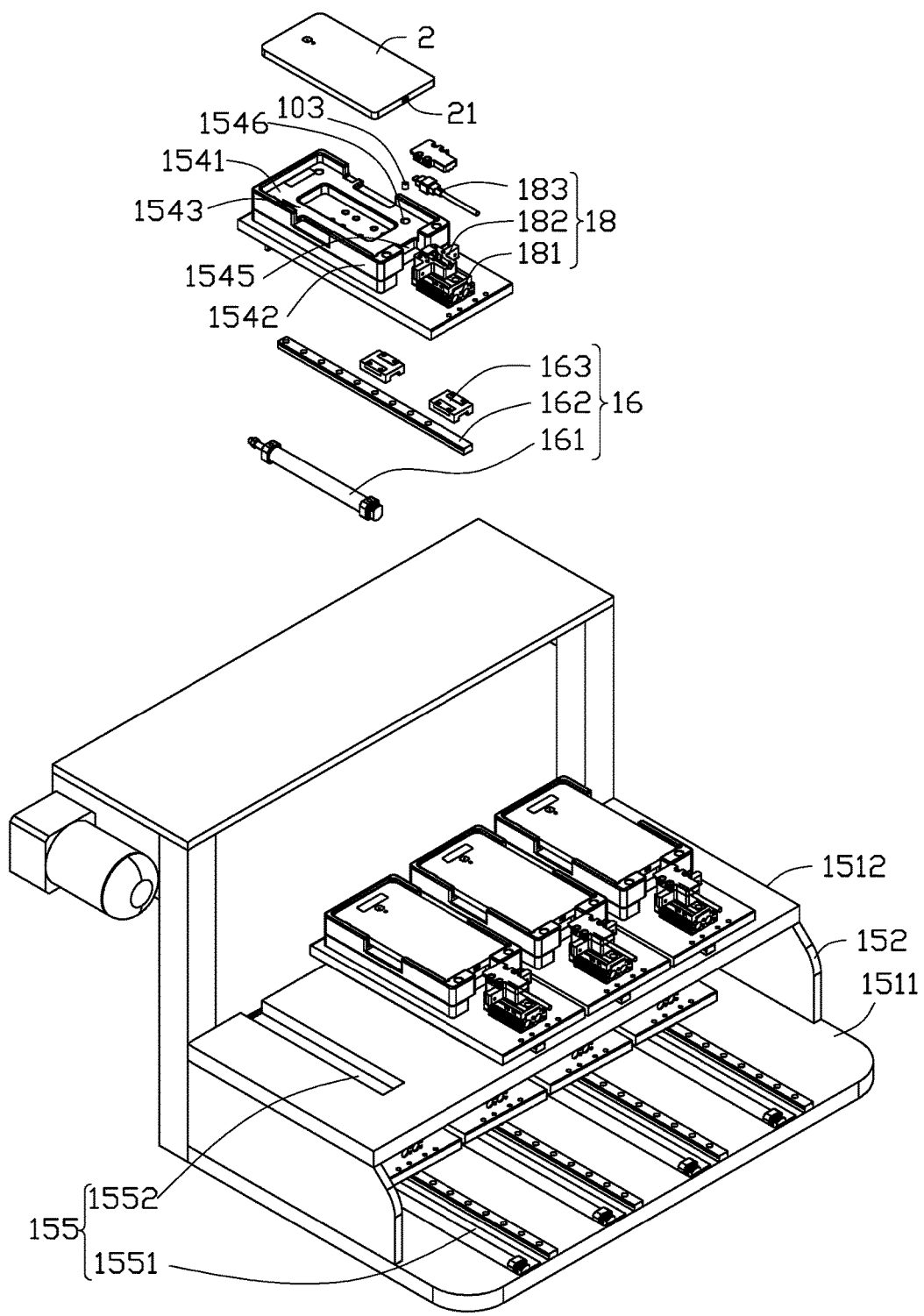
FIG. 4 is a partial exploded, isometric view of the scanning device of FIG. 1 from another view.

FIG. 4 illustrates another view of the scanning device 1 of FIG. 1. The platform 15 includes at least one mounting plate 151 (as shown in FIG. 3). The mounting plate 151 defines a number of supporting plates 153 (as shown in FIG. 3) arranged along the direction of the lead screw 132 (as shown in FIG. 3). Each supporting plate 153 carries one tray 154 (as shown in FIG. 3). Each tray 154 can receive one electronic device 2. In the exemplary embodiment, each tray 154 includes a square bottom shell 1541, and a side wall 1542 surrounding the periphery of the bottom shell 1541 and extending vertically from the bottom shell 1541. A receiving groove 1543 is defined between the bottom shell 1541 and the side wall 1542. The side wall 1542 defines a gap 1545 corresponding to the data interface 21 of the electronic device 2. In the exemplary embodiment, the number of the supporting plates 153 and the number of the trays 154 is four.

In the exemplary embodiment, the scanning device 1 also includes at least one second driving device 16. The number of the second driving devices 16 equals to the number of the supporting plates 153 of the mounting plate 151, and each second driving device 16 connects to one supporting plate 153. The second driving device 16 is used to move the supporting plate 153 connected with the second driving device 16. In at least one exemplary embodiment, the second driving device 16 includes a second driver 161, a second sliding rail 162, and a second sliding block 163 mounted on the second sliding rail 162. In the exemplary embodiment, the second driver 161 can be a power cylinder. The second sliding rail 162 is mounted on the mounting plate 151. The supporting plate 153 is set on the second sliding block 163. The second driver 161 connects to the supporting plate 153 and is used to drive the supporting plate 153 to move along the second sliding rail 162. The mounting plate 151 defines a number of receiving grooves 155. Each receiving groove 155 corresponds to one second driver 161. The receiving groove 155 is used to receive the second driver 161.

In at least one exemplary embodiment, the number of the mounting plates 151 of the platform 15 is two. The one mounting plate 151 includes a first mounting plate 1511 and a second mounting plate 1512. The first mounting plate 1511 is arranged to be parallel to the second mounting plate 1512. The platform 15 also includes a pair of supporting arms 152. The supporting arms 152 are set between the first mounting plates 1511 and the second mounting plates 1512, and are used to separate the second mounting plates 1512 from the first mounting plates 1511. The width of the first mounting plate 1511 is greater than the width of the second mounting plate 1512. The receiving groove 155 includes a first receiving groove 1551 and a second receiving groove 1552. The length of the first receiving groove 1551 is greater than the length of the second receiving groove 1552. The first receiving groove 1551 is defined in the first mounting plate 1511 and used to receive the second driver 161. The second receiving groove 1552 is set on the second mounting plate 1512 and used to receive the second driver 161.

In at least one exemplary embodiment, the scanning device 1 also includes a number of interface testing devices 18. The number of the interface testing devices 18 equals to the number of the supporting plates 153, and each interface testing device 18 corresponds to one supporting plate 153. Each interface testing devices 18 includes a third driver 181, a mounting part 182 connected to the third driver 181, and a data line plug 183 mounted on the mounting part 182. The third driver 181 is used to drive the data line plug 183 to be inserted into the data interface 21 of the electronic device 2 received in the tray 154 by the gap 1545. In the exemplary embodiment, the third driver 181 can be a power cylinder.

Figure 5:
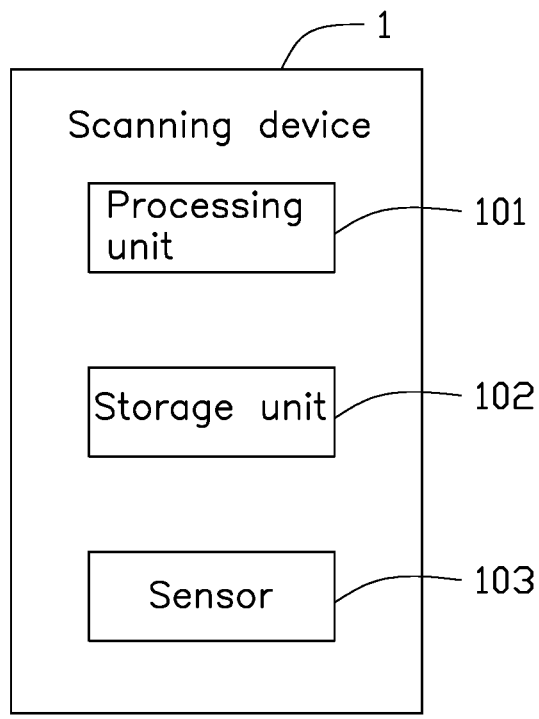
FIG. 5 is a block diagram illustrating an exemplary embodiment of the scanning device.

FIG. 5 illustrates an exemplary embodiment of the scanning device 1. The scanning device 1 includes a processing unit 101, a storage unit 102, and a number of sensors 103. The number of the sensors 103 is the same as the number of the trays 154, and each sensor 103 is for scanning one of the trays 154. The sensors 103 detect whether there is an electronic device 2 received in a tray 154. When the sensor 103 determines that there is an electronic device in the tray 154, the sensor 103 sends an interface testing signal to the processing unit 101. The processing unit 101 receives the interface testing signal sent by the sensor 103 and executes a series of program codes stored in the storage unit 102 to make the scanner 14 move towards to the electronic device 2 to scan the electronic device 2. As FIG. 4 shows, in the exemplary embodiment, the bottom shell 1541 of each tray 154 defines a through hole 1546. Each sensor 103 is received in the through hole 1546 of the tray 154. The processing unit 101 connects to the sensor 103 and the storage unit 102.

In at least one exemplary embodiment, the storage unit 102 can include various types of non-transitory computer-readable storage mediums. For example, the storage unit 102 can be an internal storage system, such as a flash memory, a random access memory (RAM) for temporary storage of information, and/or a read-only memory (ROM) for permanent storage of information. The storage unit 102 can also be an external storage system, such as a hard disk, a storage card, or a data storage medium. The processing unit 101 can be a central processing unit (CPU), a microprocessor, or other data processor chip that performs functions of the stored program code. The sensor 103 can be an infrared sensor.

In the exemplary embodiment, the processing unit 101, which controls the scanning device 1 to scan the electronic device 2, will now be described as follows. First, the processing unit 101 determines whether the interface testing signal sent by the sensor 103 of a mounting plate 151 is received by the processing unit 101. Upon receiving the interface testing signal, the processing unit 101 controls the third driver 181 to drive the data line plug 183 to be inserted into the data interface 21 of an electronic device 2 located on the mounting plate 151. Then, the processing unit 101 controls the second driver 161 of the first mounting plate 1511 to drive the supporting plate 153 to move along the second sliding rail 162 for a first preset distance toward the lead screw 132. The processing unit 101 then controls the first driver 131 to drive the lead screw 132 to rotate in a forward direction to move the assembly block 135 a second preset distance along the lead screw 132 from an initial position. The processing unit 101 further starts the scanner 14 mounted on the assembly block 135 to scan the electronic devices 2 received in the first mounting plates 1511, and controls the first driver 131 to rotate the lead screw 132 in a reverse direction to bring the assembly block 135 back to the initial position when the scanner 14 has finished scanning the electronic device 2. The processing unit 101 controls the second driver 161 of the first mounting plate 1511 to drive the supporting plate 153 to move away from the lead screw 132 for the first preset distance. Then, the processing unit 101 controls the second driver 161 of the second mounting plate 1512 to drive the supporting plate 153 to move for a third preset distance toward the lead screw 132 along the second sliding rail 162. The processing unit 101 controls the first driver 131 to drive the lead screw 132 to rotate in the forward direction to move the assembly block 135 a second preset distance along the screw 132 from the initial position. The scanner 14 mounted on the assembly block 135 is started to scan the electronic devices 2 received in the second mounting plate 1512, and the first driver 131 rotates the lead screw 132 in the reverse direction to bring the assembly block 135 back to the initial position when the scanner 14 has finished scanning the electronic device 2. Finally, the processing unit 101 controls the second driver 161 of the second mounting plates 1512 to drive the supporting plate 153 to move the third preset distance away from the lead screw 132.

Figure 6:
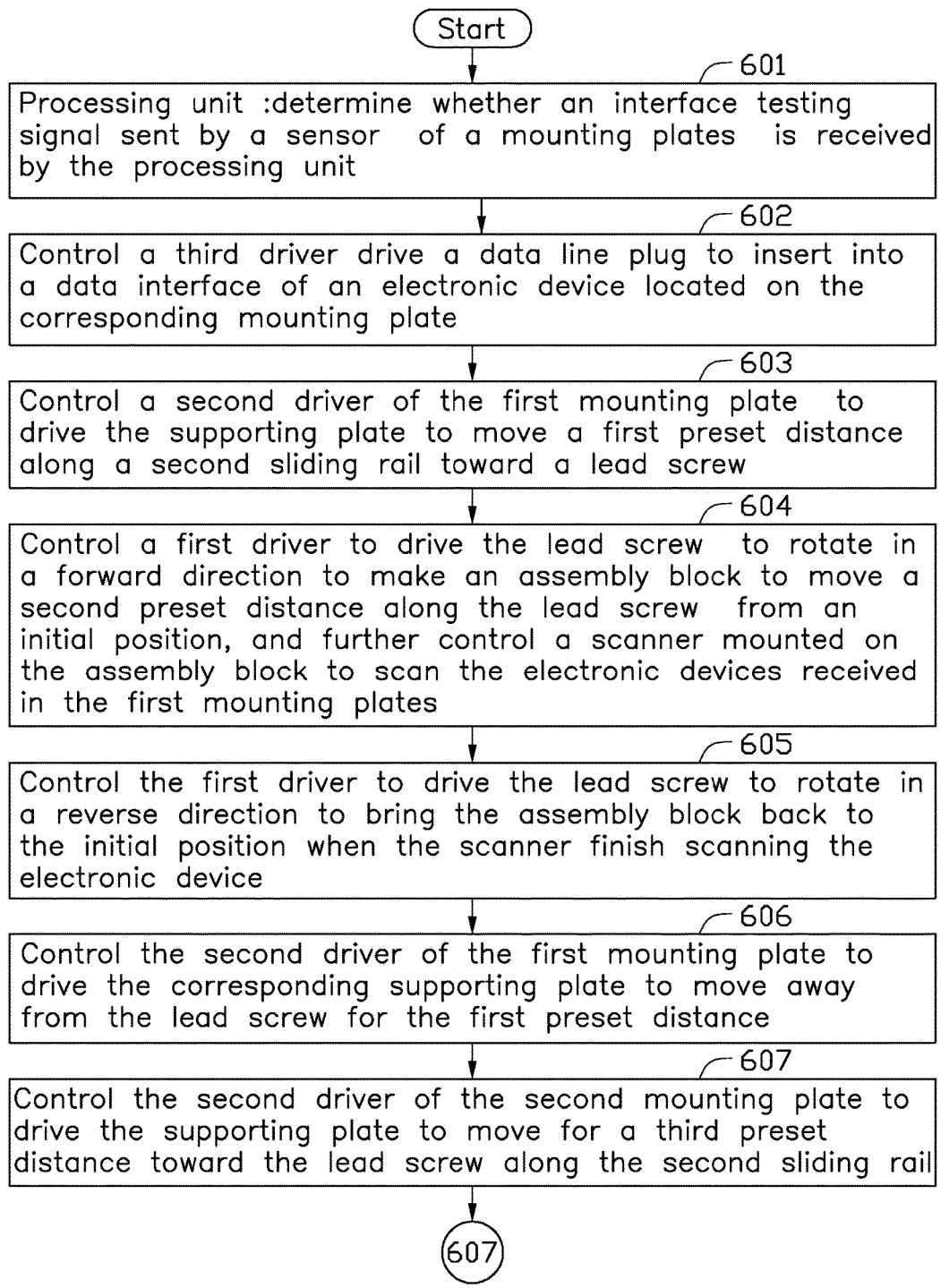
FIG. 6 is a flowchart illustrating an exemplary embodiment of a scanning method.
Figure 7:
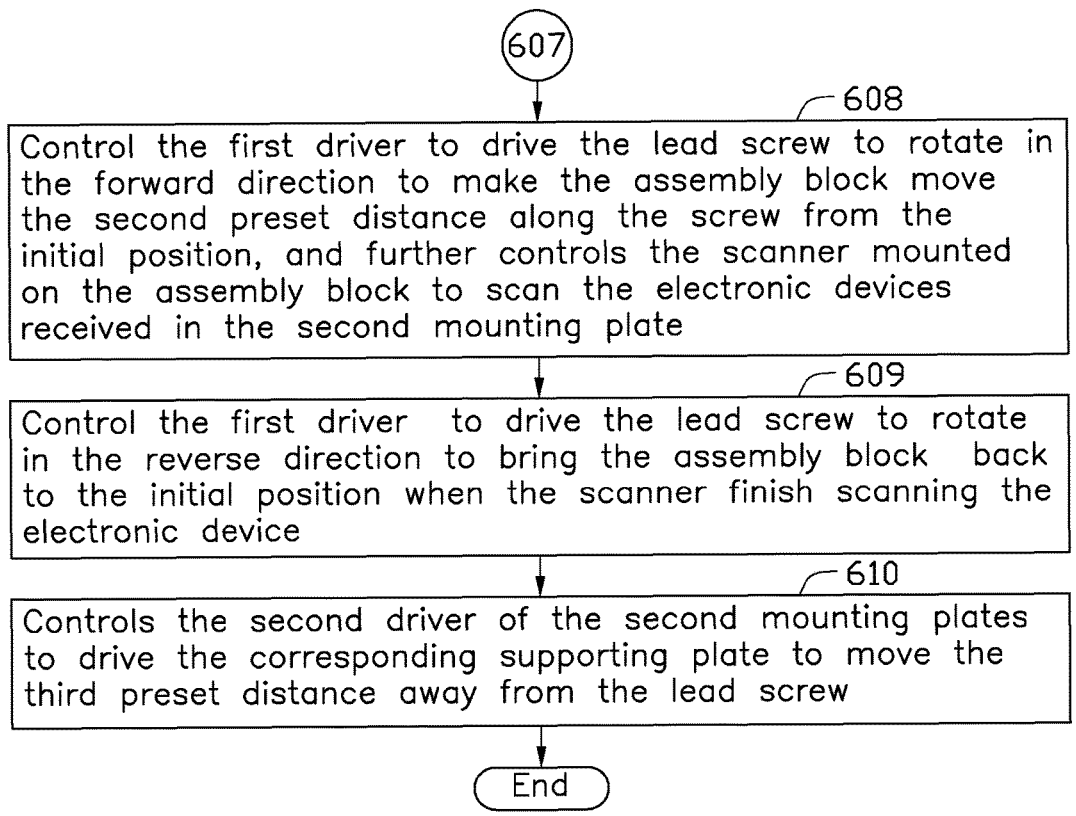
FIG. 7 is a flowchart illustrating the continuation of the exemplary embodiment of a scanning method of FIG. 6.

FIG. 6 illustrates a flowchart of an exemplary embodiment of a scanning method. The method is provided by way of example, as there are a variety of ways to carry out the exemplary method. The exemplary method described below can be carried out using the configurations illustrated in FIGS. 1-5, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The exemplary method can begin at block 601.

At block 601, a processing unit 101 determines whether an interface testing signal sent by a sensor 103 of the mounting plates 151 is received by the processing unit 101.

At block 602, when receiving the interface testing signal, the processing unit 101 controls a third driver 181 to drive a data line plug 183 into a data interface 21 of an electronic device 2 located on the mounting plate 151.

At block 603, the processing unit 101 controls a second driver 161 of the first mounting plate 1511 to drive the supporting plate 153 to move a first preset distance along a second sliding rail 162 toward a lead screw 132.

At block 604, the processing unit 101 controls a first driver 131 to rotate the lead screw 132 in a forward direction to move an assembly block 135 a second preset distance along the lead screw 132 from an initial position. Additionally, the processing unit 101 starts a scanner 14 mounted on the assembly block 135 to scan the electronic devices 2 received in the first mounting plates 1511.

At block 605, the processing unit 101 controls the first driver 131 to rotate the lead screw 132 in a reverse direction to bring the assembly block 135 back to the initial position when the scanner 14 has finished scanning the electronic device 2.

At block 606, the processing unit 101 controls the second driver 161 of the first mounting plate 1511 to drive the supporting plate 153 to move away from the lead screw 132 for the first preset distance.

At block 607, the processing unit 101 controls the second driver 161 of the second mounting plate 1512 to drive the supporting plate 153 to move for a third preset distance toward the lead screw 132 along the second sliding rail 162.

At block 608, the processing unit 101 controls the first driver 131 to rotate the lead screw 132 in the forward direction to move the assembly block 135 the second preset distance along the screw 132 from the initial position. Additionally, the processing unit 101 starts the scanner 14 mounted on the assembly block 135 to scan the electronic devices 2 received in the second mounting plate 1512.

At block 609, the processing unit 101 controls the first driver 131 to rotate the lead screw 132 in the reverse direction to bring the assembly block 135 back to the initial position when the scanner 14 has finished scanning the electronic device 2.

At block 610, the processing unit 101 controls the second driver 161 of the second mounting plates 1512 to drive the supporting plate 153 to move the third preset distance away from the lead screw 132.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A scanning device for scanning an electronic device, the scanning device comprising:
a first driving device;
a scanner, the scanner set on the first driving device and configured to scan the electronic device;
a platform configured to support the electronic device; and
the first driving device driving the scanner to move toward the electronic device placed on the platform and scan the electronic device, wherein, the first driving device comprises a first driver, a lead screw, and an assembly block, the first driver is connected to the lead screw to rotate the lead screw, the assembly block defines a second hole, and the assembly block is movably covered the lead screw by the second hole of the assembly block, wherein the scanner is mounted on the assembly block.

2. The scanning device of claim 1, wherein the first driving device further comprises a first sliding rail and a first sliding block, the first sliding rail is mounted on a horizontal plate and is parallel to the lead screw, the first sliding block is slidably mounted on the first sliding rail, the assembly block is connected to the first sliding block.

3. The scanning device of claim 1, wherein the platform comprises at least one mounting plate, each mounting plate defines a plurality of supporting plates, each supporting plate carries one tray, each tray receives one electronic device.

4. The scanning device of claim 3, further comprising at least one second driving device, wherein each second driving device corresponds to one supporting plate and each second driving device connects to the corresponding supporting plate, the second driving device is used to drive the supporting plate connected with the second driving device to move, the second driving device comprises a second driver, a second sliding rail and a second sliding block, the second sliding rail is mounted on the mounting plate, the second sliding block is mounted on the second sliding rail, the supporting plate is mounted on the second sliding block, the second driver connects to the supporting plate and is used to drive the supporting plate to move along the second sliding rail.

5. The scanning device of claim 4, wherein the mounting plates comprises a first mounting plate and a second mounting plate, the width of the first mounting plate is greater than the width of the second mounting plate, the first mounting plate defines a first receiving groove configured to receive second drivers, the second mounting plate defines a second receiving groove configured to receive another second drivers.

6. The scanning device of claim 4, further comprising a plurality of interface testing devices, wherein each interface testing device corresponds to one supporting plate, each interface testing device comprises a third driver, a mounting part connected to the third driver, and a data line plug mounted on the mounting part, the third driver is used to drive the data line plug to be inserted into the data interface of one electronic device.

7. The scanning device of claim 1, wherein the first driver is a servo motor or a step motor.

8. The scanning device of claim 5, further comprising a processing unit and a plurality of sensors, wherein each sensor corresponds to one tray and each sensor is mounted on the corresponding tray, the sensor is used to send an interface testing signal to the processing unit upon determining that there is an electronic device in the corresponding tray, the processing unit is used to receive the interface testing signal sent by the sensor and execute a series of program code to control the scanning device to scan the electronic device .

9. The scanning device of claim 6, further comprising a processing unit and a plurality of sensors, wherein each sensor corresponds to one tray and each sensor is mounted on the corresponding tray, the sensor is used to send an interface testing signal to the processing unit upon determining that there is an electronic device in the corresponding tray, the processing unit is used to receive the interface testing signal sent by the sensor and execute a series of program code to control the scanning device to scan the electronic device .

10. A scanning method on a scanning device, the method comprising:
controlling a first driving device to drive a scanner mounted on the first driving device to move a first preset distance along a first direction from an initial position;
controlling the scanner to scan an electronic device supported on a platform; and
controlling the first driving device to drive the scanner to move back to the initial position when the scanner has finished scanning the electronic device, wherein the platform comprises a first mounting plate and a second mounting plate, the first mounting plate and the second mounting plate together define a plurality of supporting plates, each supporting plate is used to receive an electronic device, and each supporting plate connects to one second driver, the method further comprises:
controlling the second driver connected to the supporting plates defined on the first mounting plate to move a second preset distance along a second direction parallel to the first direction; and
controlling the scanner to scan the electronic device received in the supporting plate defined by the first mounting plate.

11. The scanning method of claim 10, wherein the method further comprises:
controlling the second driver connected to the supporting plates defined on the second mounting plate to move a third preset distance along the second direction parallel to the first direction; and
controlling the scanner to scan the electronic device received in the supporting plate defined by the second mounting plate.

12. The scanning method of claim 11, wherein the method further comprises:
controlling the first driving device to drive the scanner to move back to the initial position when the scanner has finished scanning the electronic device received in the supporting plate defined by the second mounting plate.

* * * * *